2,863,857

TRIMESIC ACID MODIFIED POLYAMIDE

Winston Costain, Norman Fletcher, and Bernard James Habgood, Blackley, England, assignors to Imperial Chemical Industries Limited, a corporation of Great Britain No Drawing. Application October 6, 1954
Serial No. 460,771

Claims priority, application Great Britain October 7, 1953

4 Claims. (Cl. 260—78)

This invention relates to the manufacture of moulded articles from polyamides which are well adapted for use in conventional plastic shaping equipment such as extrusion or injection moulding equipment.

Polyamides have been proposed heretofore from one or more of a variety of diamines and dicarboxylic acids and/or aminocarboxylic acids or from amide-forming derivatives of these materials but the heretofore known polyamides have properties which have tended to prevent or minimise their usage for moulding from conventional injection equipment and other plastic shaping equipment. In particular, the known polyamides, at temperatures just above their melting points, are too fluid for handling easily in such equipment.

We have now found that the incorporation of a small amount of trimesic acid or an amide-forming derivative thereof into a polyamide-forming composition has the effect of modifying the resulting polyamide in such a way that melts of the modified polyamides remain highly viscous over a relatively wide range of temperatures above their melting points and are well suited for handling in conventional plastic shaping equipment.

Also, we have found the modification effected in this way is not accompanied by any serious change in the otherwise excellent properties of the polyamides for moulding and the like purposes.

According to our invention we provide new polyamides formed from a composition comprising one or more diamines and one or more dicarboxylic acids, in essentially equimolecular proportions, and optionally an aminocarboxylic acid, as such or in the form of amide-forming derivatives thereof, characterised in that the said composition also contains a small amount of trimesic acid or an amide-forming derivative thereof, together with a corresponding essentially equivalent proportion of diamine.

Also according to the present invention we provide a process for the manufacture of said new polyamides which comprises heating the polyamide-forming composition of the kind above described at least until filaments formed from a melt of the polyamide can be extended by cold-drawing into fibres.

Amide-forming derivatives of the ingredients include esters or the amides of the acids, and the preformed salts of the acids with the diamines. It is preferred to use the ingredients in the form of the preformed salts thereof, since these salts are easily obtained in a pure form and since they contain the respective ingredients in essentially equimolecular proportions.

A small proportion of a mono-functional amide-forming reactant, for example, acetic acid, may also be used for the purpose of stopping the polyamide forming reaction at any desired stage in the manner described in Great Britain specification No. 495,790.

A small proportion of a delustrant, pigment or other colouring material, for example, titanium dioxide, may be included among the ingredients, or added at any stage in the process.

The amount of trimesic acid that is used, as such or in the form of an amide-forming derivative, is necessarily small since the use of a large amount results in the production of an intractable material, insoluble in the normal polyamide solvents and which is unsuitable for moulding. In general the amount used is from 0.3 to 3.18 molar percent of the total dicarboxylic acid and aminocarboxylic acid content of the polyamide-forming composition. If less than 0.3% is used the effect on the properties of the polyamide is still apparent but is so diminished as not to be of technical value. Within this broad range, variations need to be made according to the amount of monofunctional amide-forming reactant used. Thus in the absence of such a reactant, the preferred molar percent is from 0.3 to 1.05. With the use of 0.5 molar percent of acetic acid, calculated on the total dicarboxylic acid and aminocarboxylic acid content, the preferred molar percent of trimesic acid is from 0.6 to 1.8; with 1.4 molar percent of acetic acid, it is 1.2 to 3.18. More than 1.4 molar percent of acetic acid is not generally used. The preferred proportion to correspond with any desired proportion of monofunctional reactant can be readily determined by trial. The preferred proportion of trimesic acid can be reduced, also, by subjecting the polyamide during manufacture to vacuum treatment or by passing an inert gas through the melt, as illustrated in the examples.

The heating of the polyamide-forming composition is carried out in accordance with conventional practice for the manufacture of fibre-forming polyamides, usually at temperatures from about 265°–285° C. The heating is carried out under conditions which permit the removal of water or other by-product, at least during the later stages of the heating. Reduced pressures may be used to facilitate the removal of water or other by-product and a stream of an oxygen-free gas, for example, nitrogen, may be passed through and/or over the reaction mass.

Although the new polyamides have excellent fibre-forming properties, they find their greatest utility in the art as materials for plastic shaping, as by extrusion by injection moulding.

According therefore to a further feature of our invention we provide a process for producing shaped polyamide articles by means of conventional plastic shaping equipment wherein there are used the polyamides of this invention.

The invention is illustrated by the following examples in which parts and percentages are expressed by weight.

Example 1

A mixture of 100 parts of the salt formed from equimolecular quantities of hexamethylene diamine and adipic acid, and 0.3 part of the neutral salt formed from equivalent quantities of hexamethylene diamine and trimesic acid is heated at 220° C. for 2 hours in a closed vessel which has been previously purged out with oxygen-free nitrogen and evacuated to a pressure of 10–15 mm. of mercury. The vessel and contents are allowed to cool, the vessel is opened, fitted with a means for passing oxygen-free nitrogen through the contents, again purged out with oxygen-free nitrogen, and the heating is continued until the polymer is again fully molten and thereafter for 1¼ hours at 282° C. at atmospheric pressure, whilst a slow stream of oxygen-free nitrogen is passed through the melt. The vessel and contents are allowed to cool when the product is obtained as a tough, white solid which has an inherent viscosity (1% solution in m-cresol) 1.6. Melt viscosity at 278° C.: 8,350 poises.

*Example 2*

A mixture of 95.0 parts of the salt formed from equimolecular quantities of hexamethylene diamine and adipic acid, 5.0 parts of the salt formed from equimolecular quantities of hexamethylene diamine and sebacic acid and 0.2 part of the salt formed from hexamethylene diamine and the equivalent amount of trimesic acid is formed into a polyamide in the manner described in Example 1.

The product is a tough, white, crystalline solid with inherent viscosity (1% solution in m-cresol) 1.43.

*Example 3*

A mixture of 100 parts of the salt formed from equimolecular quantities of hexamethylene diamine and adipic acid, 1 part of the neutral salt formed from hexamethylene diamine and trimesic acid and 0.115 part of acetic acid is formed into a polyamide in the manner described in Example 1.

The product is a tough, white, crystalline solid with inherent viscosity (1% solution in m-cresol) 1.2.

*Example 4*

A solution of 100 parts of the salt formed from equimolecular quantities of hexamethylene diamine and adipic acid and 1 part of the neutral salt of hexamethylene diamine and trimesic acid in 66 parts of distilled water is heated for 1.5 hours at 250 pounds per square inch pressure, the temperature being raised during this period from 210° C. to 244° C. The pressure is gradually reduced over a further 1.5 hours to atmospheric pressure, the temperature being raised during this time to 276° C. at which it is maintained for a further hour.

The polymer is extruded from the vessel under 30 lb./sq. inch of oxygen-free nitrogen and quenched. The product is a tough, white solid which has a softening point of 267° C. and a melt viscosity of 67,000 poises at 278° C.

In order to demonstrate the utility of the new polyamides for injection moulding, samples were tested in the apparatus hereinafter described.

The apparatus consists of a cylinder of ⅜″ diameter, 4″ in length, fitted at the base with a die, the hole of the die being 0.052″ in diameter. The cylinder is surrounded by a heating element, lagged to prevent heat loss, and means for adjusting and recording the temperature. Fitting into the cylinder is a piston at the upper extremity of which there is a weight of 12½ lbs.

In carrying out the tests, a quantity of the polyamide is dried at 110° C. for 4 hours in a stream of oxygen-free nitrogen at a pressure of 2 mm. of mercury and is then placed in the cylinder, the temperature of the cylinder is brought up to a temperature just above the softening point of the polyamide, and the temperature is maintained for 10 minutes. The piston is then placed in the cylinder, whereupon the softened polyamide is forced through the hole in the dye by virtue of the pressure exerted upon the uppermost surface of the polyamide.

Thereafter, the temperature is increased slowly and at a series of increasing temperatures, measurements are made of the quantities of molten polyamide extruded from the hole in the die. A record is made of the lowest temperature at which extrusion commences and the lowest temperature at which the polyamide under test is extruded from the hole at the rate of 0.5 gram per minute.

The results obtained are expressed in the following table, and, for comparative purposes, data are also given for corresponding polyamides which have not been modified with the trimesic acid.

1

|  | Lowest Temperature at which extrusion commences, °C. | Lowest Temperature at which product is extruded at 0.5 g./min. | Difference, °C. |
|---|---|---|---|
| Polyamide from hexamethylene diamine and adipic acid | 266 | 267 | 1 |
| Product of Example 1 | 271 | 306 | 35 |
| Product of Example 2 | 265 | 298 | 33 |
| Product of Example 3 | 267 | 280 | 13 |
| Product of Example 4 | 267 | 288 | 21 |

The results expressed in the table indicate that, whereas the unmodified polyamides are extruded inconveniently rapidly at temperatures above their melting points, the modified polyamides may be extruded much more slowly over a wider range of temperatures.

In order to indicate that there has been no serious falling off of other physical properties of the unmodified polyamides, films of thickness 0.004–0.008″ were made by pressing melts, and physical measurements were made from samples of these films. The average results obtained are expressed in the following table:

2

| Property | Polyamide from hexamethylenediamine and adipic acid | Product of Example 1 | Product of Example 2 | Product of Example 3 | Product of Example 4 |
|---|---|---|---|---|---|
| Tensile strength, lb. per square inch | 6,370 | 7,428 | 5,700 | 2,843 | 4,443 |
| Elongation at break as percent | 57 | 9 | 338 | 70 | 145 |
| Modulus at 10% in lb. per square inch | 6,320 | -------- | 2,857 | 2,318 | 3,201 |
| Permanent set as percent | 37 | 3 | 166 | 15 | 81 |

What we claim is:

1. A fibre-forming polyamide formed by heat reacting a composition comprising a reactant from at least the first two of the following three groups of polyamide-forming reactants: (1) diamines and amide-forming derivatives thereof; (2) dicarboxylic acids and amide-forming derivatives thereof; and (3) amino-carboxylic acids and amide-forming derivatives thereof, the reactants of groups (1) and (2) being present in essentially equi-molecular proportions; a modifier selected from the group consisting of trimesic acid and amide-forming derivatives thereof and wherein said amide-forming derivatives are selected from the group consisting of esters, amides and preformed salts of said acid with diamines present in an amount between 0.3 to 3.18 molar percent of the total dicarboxylic acid and amino-carboxylic acid content of said composition, and a corresponding essentially equivalent proportion of diamine.

2. The fibre-forming polyamide of claim 1 wherein said composition includes an amino-carboxylic acid.

3. The fibre-forming polyamide of claim 1 wherein said modifier is present in said composition in an amount between from 0.3 to 1.05 molar percent of the total dicarboxylic acid and amino-carboxylic acid content.

4. The fibre-forming polyamide of claim 1 wherein said modifier and the corresponding essentially equivalent proportion of diamine are present in said composition in the form of a neutral salt of trimesic acid and diamine.

References Cited in the file of this patent
UNITED STATES PATENTS 2,272,466  Hummel _____ Feb. 10, 1942
2,621,168  Ross et al. _____ Dec. 9, 1952

FOREIGN PATENTS 570,858  Great Britain _____ July 25, 1945